United States Patent [19]

Goda

[11] Patent Number: 4,961,358
[45] Date of Patent: Oct. 9, 1990

[54] APPARATUS FOR FEEDING ELONGATED MATERIAL

[76] Inventor: Hidemitsu Goda, 383-18, Kano, Higashi-Osaka-shi, Osaka, Japan

[21] Appl. No.: 330,691

[22] Filed: Mar. 30, 1989

[30] Foreign Application Priority Data

Oct. 18, 1988 [JP] Japan .................................. 63-263705

[51] Int. Cl.$^5$ .......................... B23B 13/10; B23B 15/00
[52] U.S. Cl. ........................................... 82/127; 82/126
[58] Field of Search ................... 82/124, 125, 126, 127

[56] References Cited

U.S. PATENT DOCUMENTS

| 851,547 | 4/1907 | Muncaster | 82/124 |
|---|---|---|---|
| 3,874,520 | 4/1975 | Scheler | 82/124 |
| 4,200,013 | 4/1980 | Momoi et al. | 82/127 |
| 4,324,162 | 4/1982 | Uehara | 82/127 |
| 4,700,593 | 10/1987 | Cucchi | 82/125 |

Primary Examiner—William E. Terrell

[57] ABSTRACT

An apparatus comprising a plurality of support members 6 mounted on a rail 5 and movable longitudinally of the rail, a housing 7 mounted on each of the support members 6 and rotatable about a support shaft 22 perpendicular to the length of the rail, and a contact ring mounted on the housing and rotatable about an axis perpendicular to the support shaft 22. An elongated material 31 is inserted through the contact rings 8 and rotated about its longitudinal axis as positioned longitudinally of the rail 5. The angle of inclination of the rotational axis of the material 31 relative to the axis of rotation of each contact ring 8 is variable by rotating the housing 7 about the support shaft 22. Lengths of elongated material of varying diameters are supportable each at its outer periphery by the outer periphery of each contact ring 8 at its axial one end and the other end thereof, with the center axis of the material positioned at a constant level, while the material is prevented from deflective revolution during its rotation. The elongated material 31 supported by the contact rings 8 is fed longitudinally thereof by a feed mechanism 60.

13 Claims, 10 Drawing Sheets

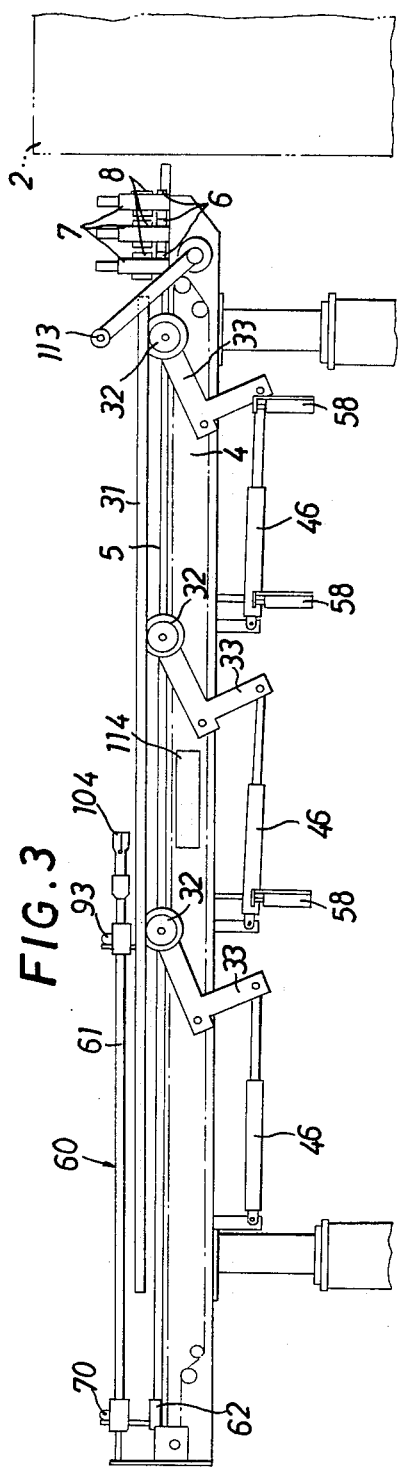
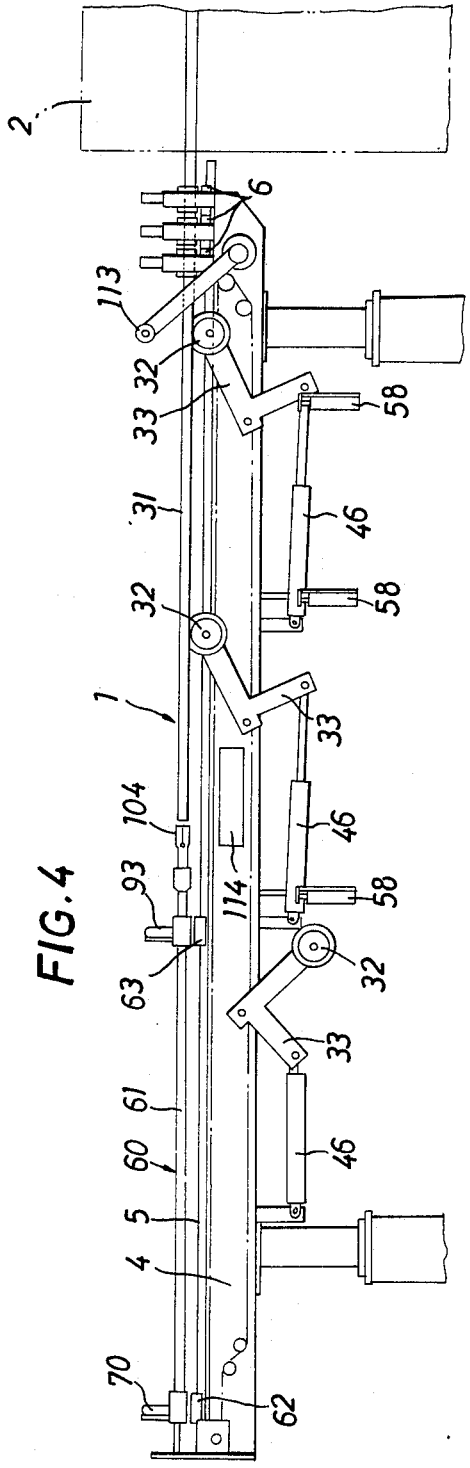
FIG.3
FIG.4

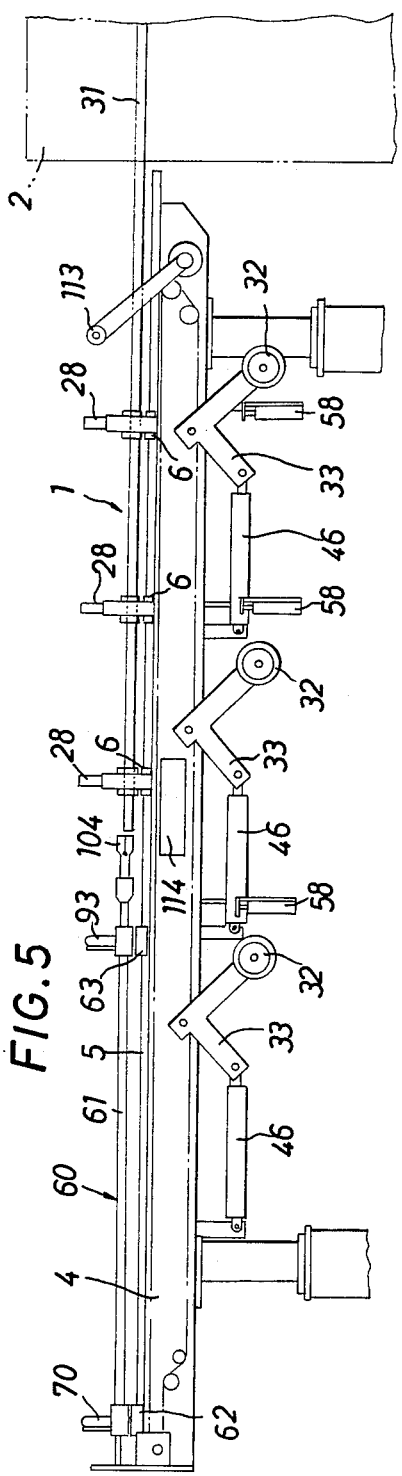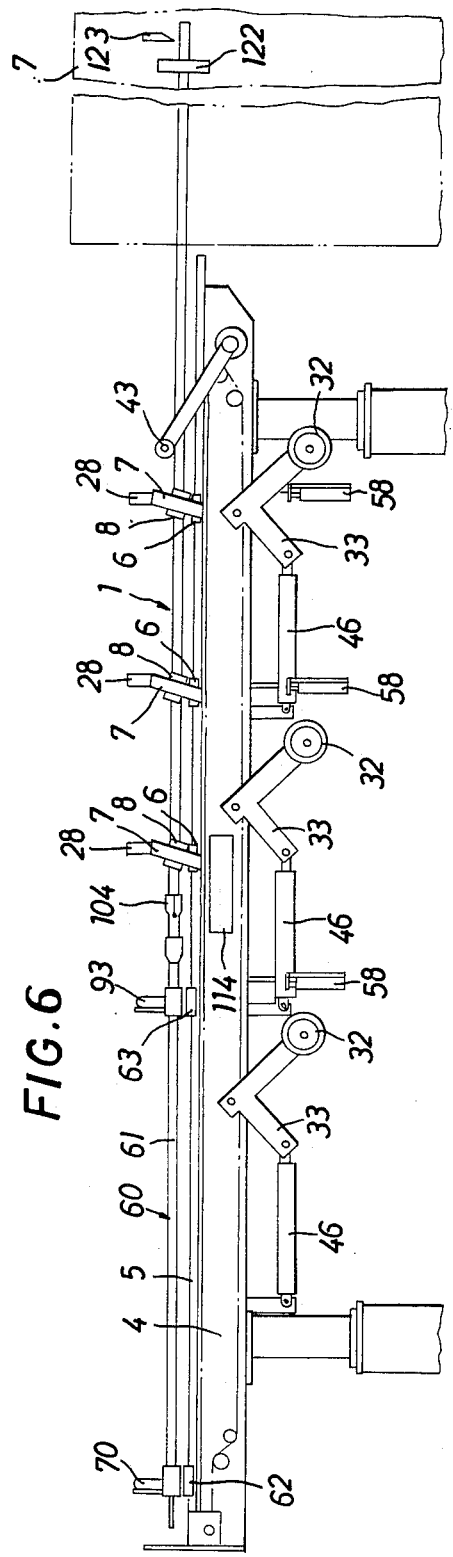

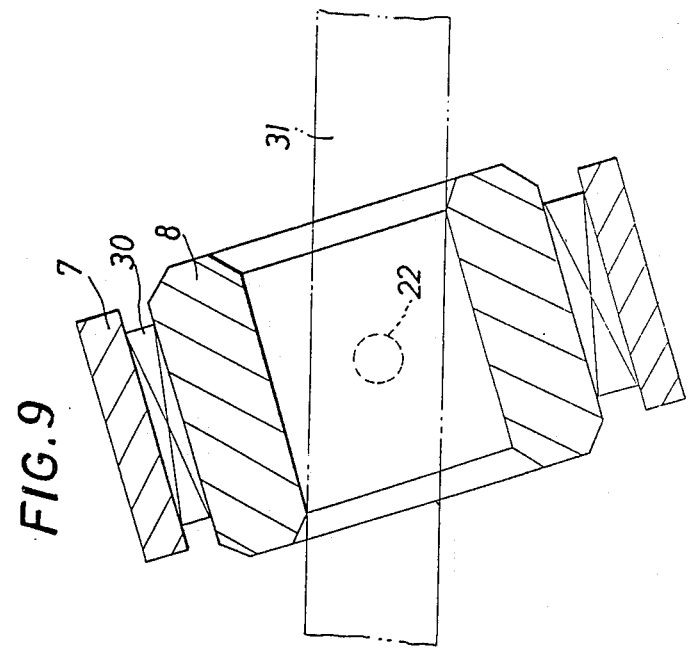
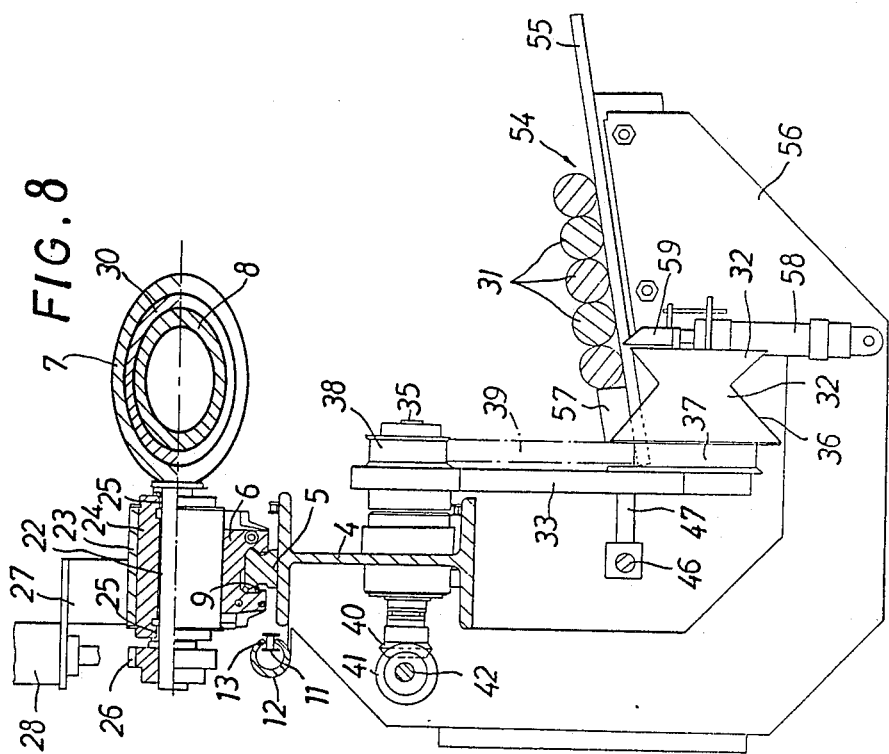

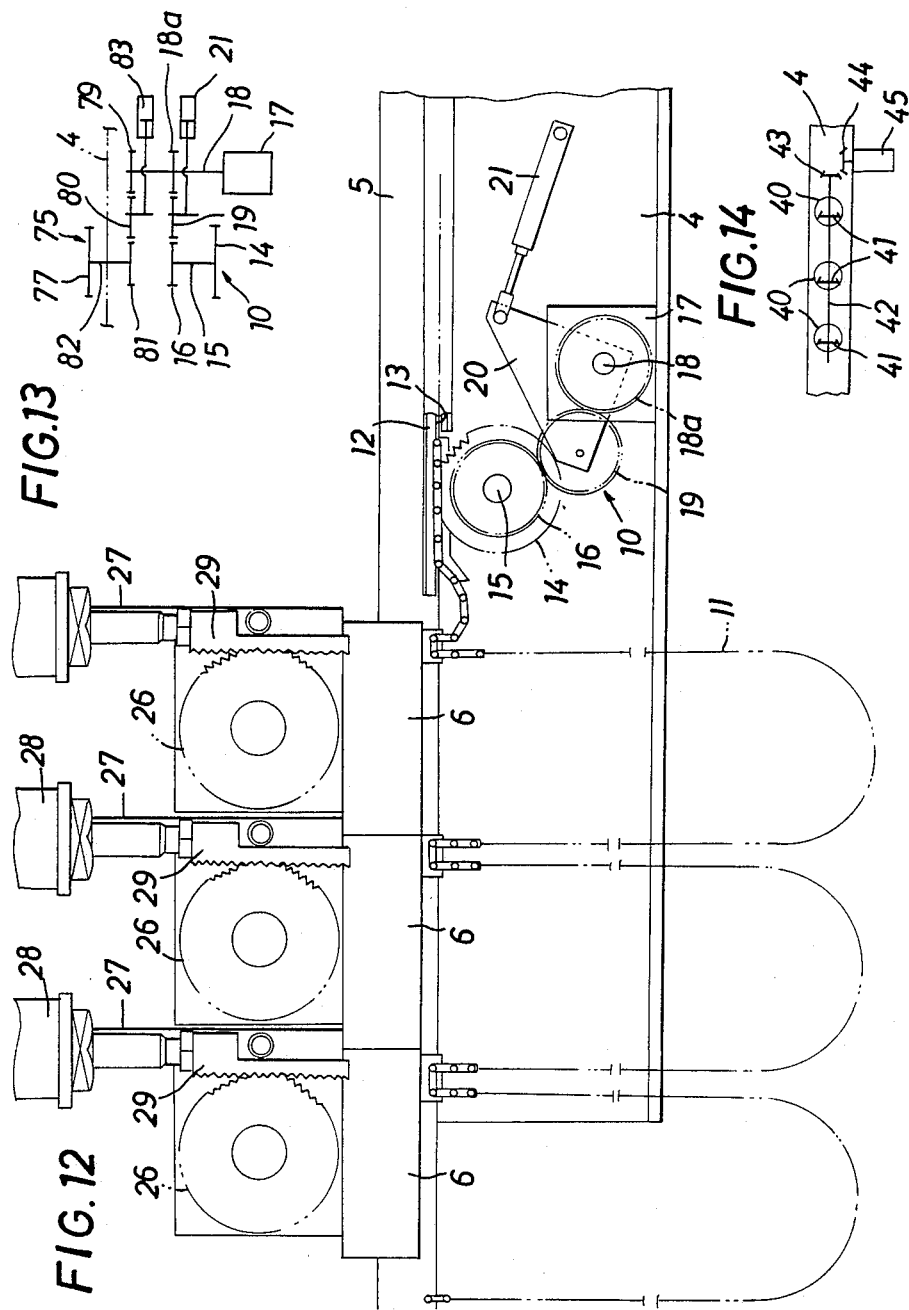

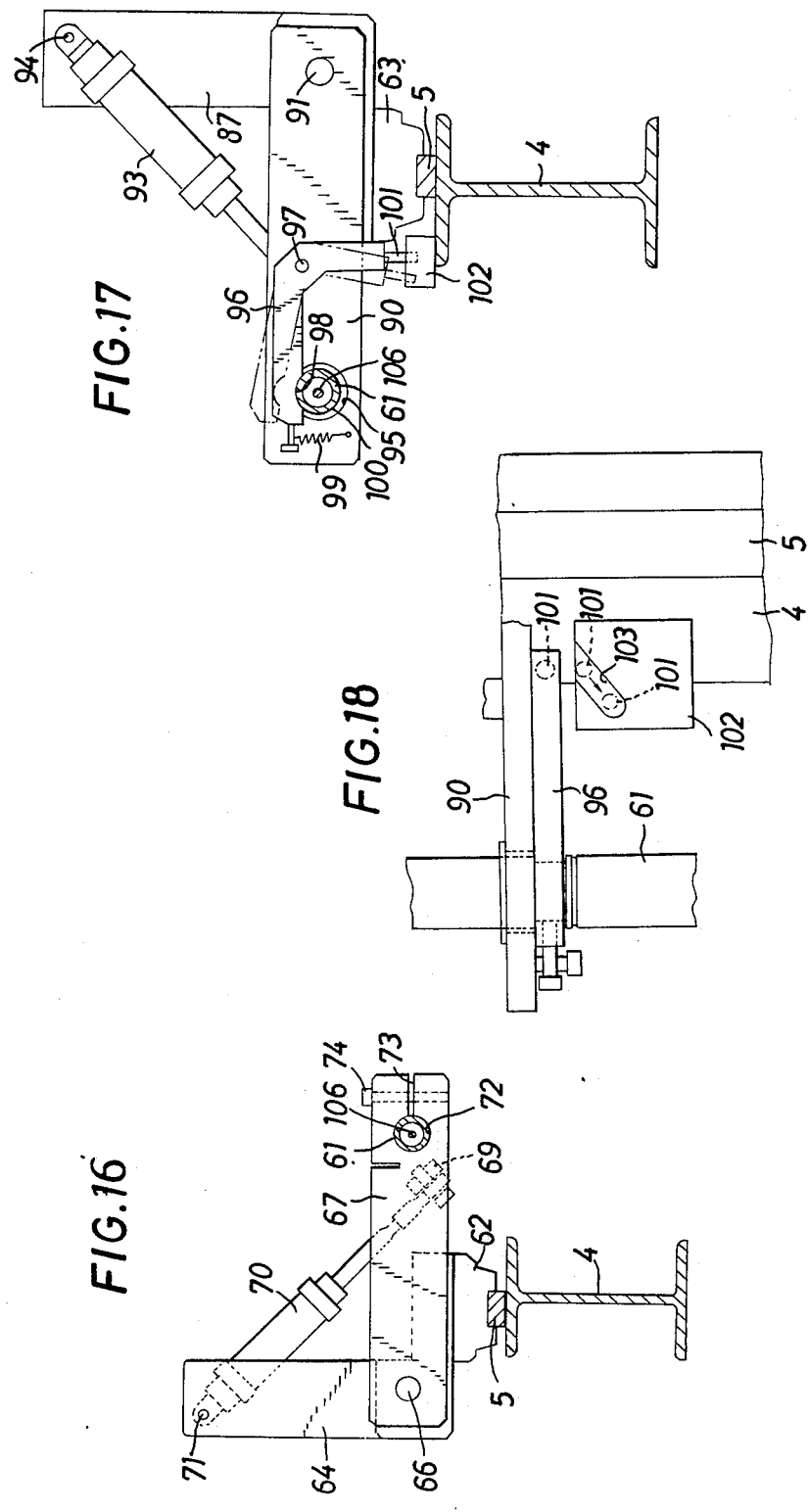

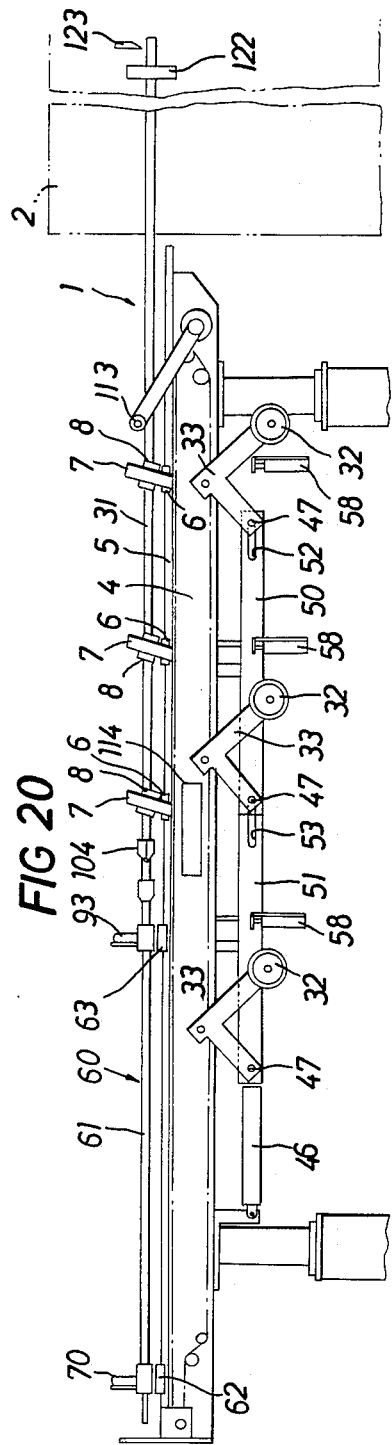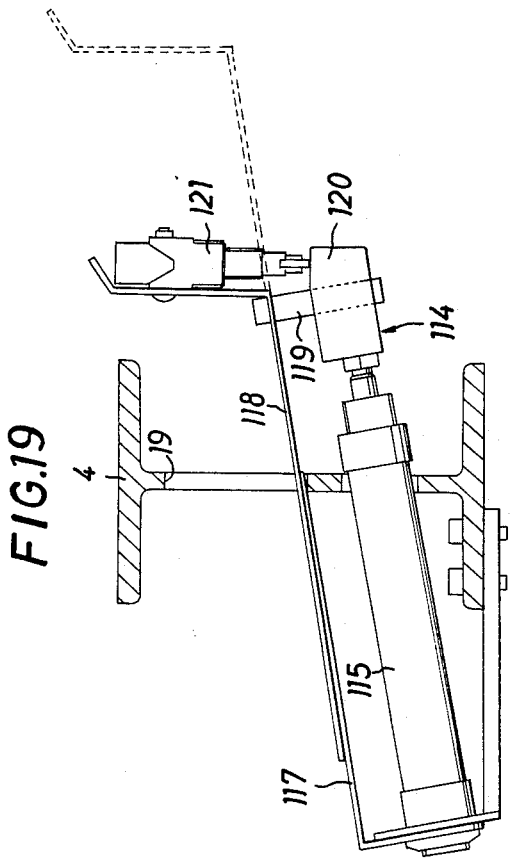

APPARATUS FOR FEEDING ELONGATED MATERIAL

FIELD OF THE INVENTION AND RELATED ART STATEMENT

The present invention relates to an apparatus for feeding an elongated workpiece longitudinally thereof while the workpiece is in rotation about its longitudinal axis.

When an elongated workpiece is to be machined from one end while rotating the workpiece about its longitudinal axis, an apparatus is needed for feeding the elongated workpiece longitudinally thereof.

Such a feeding apparatus is known which comprises a pipe having an opening in its top side and a U-shaped cross section for supporting an elongated workpiece as inserted therein and feeding the workpiece longitudinally thereof while rotating the workpiece inside the pipe.

OBJECT AND SUMMARY OF THE INVENTION

The above feeding apparatus has the problem that the elongated workpiece, while in rotation, is in sliding contact with the U-shaped pipe and becomes defaced.

Further when an elongated workpiece of a different diameter is to be handled, there arises a need to alter the position of the workpiece relative to the pipe by a cumbersome adjusting procedure. It is also necessary to adjust the position of the feeder mechanism relative to the elongated workpiece.

Another problem is encountered in that when the elongated workpiece is rotated, the rotation involves deflection, impairing the accuracy with which the workpiece is machinable.

The main object of the present invention is to overcome the above problems.

The apparatus of the invention for feeding a rotating elongated workpiece 31 is characterized in that it comprises a plurality of support members 6 mounted on a rail 5 and movable longitudinally of the rail, a housing 7 mounted on each of the support members 6 and rotatable about a support shaft 22 perpendicular to the length of the rail, a contact ring 8 mounted on the housing 7 and rotatable about an axis perpendicular to the support shaft 22, the elongated workpiece 31 being insertable through the contact rings 8 and rotatable about its longitudinal axis as positioned longitudinally of the rail 5, the angle of inclination of the rotational axis of the elongated workpiece 31 relative to the axis of rotation of each contact ring 8 being variable by the rotation of the housing 7 about the support shaft 22, the outer periphery of the elongated workpiece 31 being supportable by the inner periphery of each contact ring 8 at its axial ends and, and a feed mechanism 60 is provided for feeding the elongated workpiece 31 longitudinally thereof while the workpiece 31 is in rotation as supported by the contact rings 8.

According to the present invention, the elongated workpiece 31 is supported by the contact rings 8, which rotate with the rotation of the workpiece 31.

The elongated workpiece 31 is supported by the inner periphery of each contact ring 8 at its axial ends. This diminishes the deflection of the workpiece 31 during rotation. More specifically stated with reference to FIG. 22, an elongated workpiece 31 has its outer periphery supported at one position with respect to the length thereof by a plurality of support members 130 mounted on a fixed frame 129 and adjustingly movable radially of the frame. The portions of the workpiece 31 to the front and rear of the supported position then greatly deflect and revolve as shown in FIG. 21. On the other hand, when the outer periphery of the elongated workpiece 31 is supported by the contact ring 8 at two positions with respect to its length as seen in FIG. 11, the deflection during revolution of the workpiece 31 can be diminished. Moreover, since more than one contact ring 8 is provided, the deflection during revolution can be further diminished.

Even when the elongated workpieces 31 to be supported by the plurality of contact rings 8 are different in diameter, the center of the workpieces can be positioned at a constant level above the rail 5 at all times because the angle of inclination of the rotational axis of the elongated workpiece 31 relative to the axis of rotation of each contact ring 8 is variable by pivoting the housing 7 about the support shaft 22. Thus, the elongated workpiece 31 is supportable by the inner periphery of each contact ring 8 at its axial ends and, with the axis of the workpiece 31 at the constant level, by varying the angle of inclination in accordance with the diameter of the workpiece 31.

Since the housings 7 are movable on the rail 5, varying lengths of elongated workpiece 31 can be supported. Further since the housings 7 are movable with the longitudinal feed of the elongated workpiece 31, the restriction imposed on the amount of feed due to the presence of the housings 7 can be minimized.

Preferably, a plurality of rotary members 32 are arranged longitudinally of the rail 5. Each of these rotary members is rotatable about a shaft 34 perpendicular to the length of the rail 5 for supporting the elongated workpiece 31 thereon and is shiftable to an upward supply position and a downward waiting position. The elongated workpiece is transported longitudinally thereof and inserted through the contact rings by the rotation of the rotary members when they are in the supply position with the workpiece 31 placed thereon. More specifically, the elongated workpiece 31 is placed on the rotary members in the waiting position, and the rotary members 32 are brought to the supply position and thereafter rotated, whereby the workpiece 31 is inserted through the contact rings 8. The rotary members 32 are subsequently brought to the waiting position again, with the result that the housings 7 are movable, free of interference from the rotary members 32, to the positions where the elongated workpiece 31 is to be supported by the contact rings.

Preferably, the apparats further comprises a magazine device 54 having a support frame 55 at one diametrical side of the rotary member 32, the support frame 55 having an inclined upper surface slanting downward toward the rotary member 32 in a direction perpendicular to the rail 5, a plurality of lengths of elongated workpieces 31 being placeable on the inclined surface as arranged side by side along the rail with the lowermost length of elongated workpiece 31 positioned above the rotary member 32 when the rotary member 32 is in the waiting position.

Lengths of elongated workpieces 31 are supplied one by one to the rotary members 32 by the magazine device 54.

Preferably, each rotary member 32 is mounted on an arm 33 that is pivotally movable upward and downward by a cylinder 44, the arms 33 being connected to one another by a connecting plate 50 or 51 along the rail, the connecting plate being connected at one end to one of the two adjacent arms 33 through a slit 52 or 53 and at the other end thereof to the other arm 33 by a pivot 47.

This arrangement precludes the likelihood that one of the arms 33, which are arranged longitudinally of the rail, will move in preference to the other arm, thereby preventing the elongated workpiece 31 from slipping off the rotary members 32. The other arm 33 is movable in preference to the above-mentioned one arm 33 to preclude interference between the rotary member 32 and the feed mechanism 60.

Preferably, the feed mechanism 60 comprises a holder that is movable longitudinally of the rail 5, a feed pipe 61 mounted on the holder, a chuck 104 attached to the forward end of the feed pipe 61 for holding the elongated workpiece 31, and a rod 106 inserted through the feed pipe 61 for pushing out a scrap piece 31a of the workpiece 31 from the chuck 104.

The elongated workpiece 31, when held by the chuck 104, moves longitudinally of the rail with the movement of the holder. The scrap 31a can be pushed out from the chuck 104 by the rod.

Preferably, the feed pipe 61 is movable upward and downward so as to be shiftable between a retracted position above the elongated workpiece 31 and a position where the elongated workpiece 31 can be held with the chuck 104.

With this arrangement, the contact rings 8 are caused to support the elongated workpiece 31 with the feed pipe 61 in the upward retracted position, the workpiece 31 is then moved longitudinally thereof, and the feed pipe 61 is thereafter lowered to the other position, whereby the workpiece 31 can be held by the chuck 104. This assures effective use of the space along the rail 5.

Preferably, a pair of holders 62, 63 are arranged side by side along the length of the rail 5, one of the holders, 63, being positioned closer to the contact ring 8 and selectively changeable to a state in which the holder 63 is slidable relative to the rail longitudinally thereof or to a state in which the holder is restrained from sliding longitudinally of the This arrangement increases the amount of feed of the elongated workpiece 31 along the rail to the greatest possible extent.

Preferably, a scrap discharge mechanism 114 is disposed below the scrap 31a to be pushed out from the chuck 104 by the rod 106.

Preferably, the support members 6 are interconnected by a chain 11 so as to be spaced apart from one another at a specified distance, the support members being drivingly movable by the chain 11 longitudinally of the rail 5.

This also assures effective use of the space along the rail 5.

Preferably, a sensor 113 is provided for detecting the distance of movement of the elongated workpiece 31 in the longitudinal direction.

The sensor is useful for operating the feeding apparatus in the absence of the operator.

BRIEF DESCRIPTION OF THE DRAWINGS

FIGS. 1 to 19 show an embodiment of the invention;
FIGS. 1 to 7 are right side elevations of the embodiment, i.e. feeding apparatus, in different states;
FIG. 8 is a rear view in section of the same;
FIGS. 9 and 10 are sectional views showing lengths of elongated workpieces of different diameters as supported by a contact ring;
FIG. 11 is a diagram for illustrating the elongated workpiece as restrained from deflecting during revolution;
FIG. 12 is a left side elevation showing the front portion of the feeding apparatus;
FIG. 13 is a diagram showing drive mechanisms for support members and holders;
FIG. 14 is a diagram showing a drive mechanism for rotary members;
FIG. 15 is a right side elevation of a feed mechanism;
FIG. 16 is a rear view in section showing the same;
FIG. 17 is a front view in section of the same;
FIG. 18 is a fragmentary plan view of the same;
FIG. 19 is a rear view in section of a scrap discharge mechanism;
FIG. 20 is a right side elevation showing another feeding apparatus embodying the invention.

DESCRIPTION OF THE PREFERRED EMBODIMENTS

Embodiments of the invention will be described below with reference to the drawings.

Figure 1:
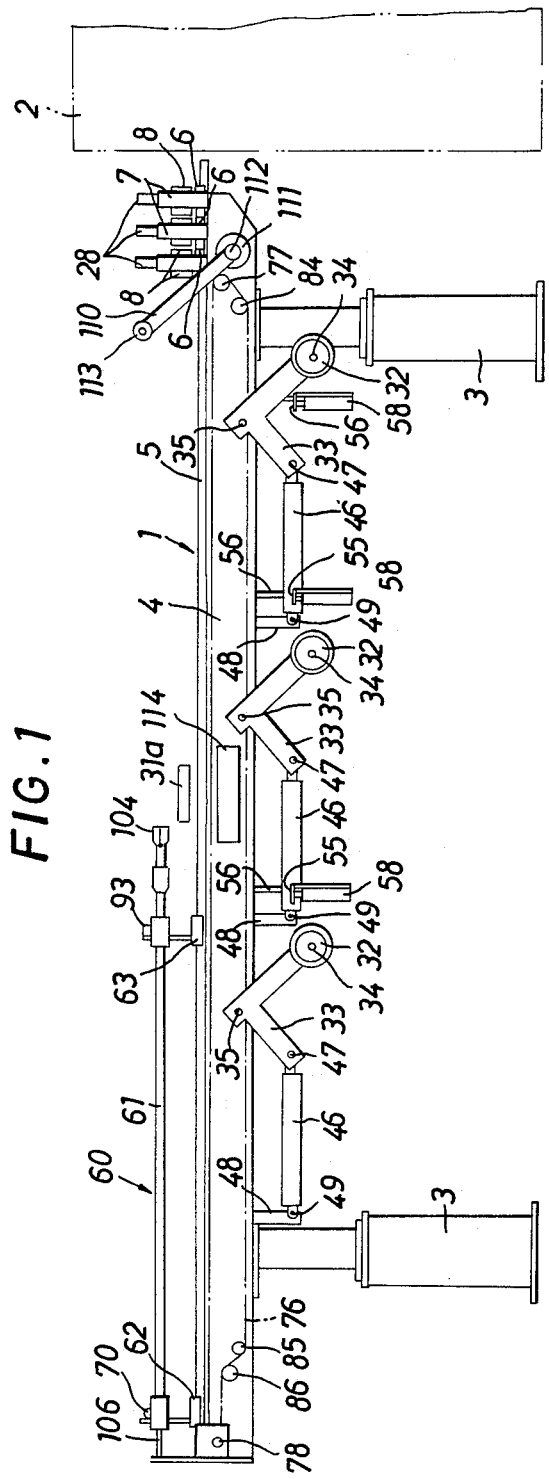

FIG. 1 shows a feeder 1 for use with a working machine 2 for cutting an elongated workpiece while rotating the workpiece about its longitudinal axis. The drawing is an overall side elevation of the feeder. The feeder 1 has a base 4 supported on a pair of support columns 3 with a rail 5 installed on the base 4. As seen in FIG. 8, the base 4 has an I-shaped cross section.

Three support members 6 are mounted on the rail 5 and are movable longitudinally of the rail (rightward or leftward in the drawing). As seen in FIGS. 5 and 6, the support members 6 are shiftable.

With reference to FIG. 8, the support member 6 is supported on the rail 5 with rotatable balls 9 provided therebetween and is thereby made movable smoothly and accurately longitudinally of the rail.

FIGS. 12 and 13 show a support member drive mechanism 10 for moving the support members 6. More specifically, the supports 6 are connected to a chain 11 having one end attached to the rail 5 and the other end supported by a guide 12 so as to be positioned along the rail 5. As shown in FIG. 8, the guide 12 is in the form of a pipe having a longitudinal cutout 13. The chain 11 is fitted in the cutout 13 of the guide 12 to guide the chain 11 longitudinally of the rail.

A sprocket 14 meshing with the chin 11 is mounted on the base 4 and is rotatable about a shaft 15. A movable gear 19 is in mesh with a gear 16 mounted on the shaft 15 and a gear 18a mounted on the output shaft 18 of a motor 17. Thus, the rotation of the output shaft 18 of the motor 17 rotates the sprocket 14 to move the chain 11 and thereby move the support members 6.

When the three support members 6 are positioned at the front end (right end in FIG. 1, left end in FIG. 12) of the rail 5, the chain 11 hangs down between the adjacent support members 6 and between the front end of the rail 5 and the foremost support member 6 as indicated in phantom line in FIG. 12, so that the support members, when moved rearward, will be arranged at a specified spacing as shown in FIGS. 5 and 6.

The movable gear 19 is attached to a pivotal plate 20 which is pivotally movable about the output shaft 18 of the motor 17. A pneumatic cylinder 21 has a piston rod pivoted to one end of the pivotal plate 20. The base end of the cylinder 21 is pivoted to the base 4. The pivotal plate 20, when pivotally moved by the axial movement of the piston rod of the cylinder 21, selectively brings the movable gear 19 into or out of meshing engagement with the gear 16 to effect or interrupt power transmission.

Housing 7 is attached to each support member 6. With reference to FIG. 8, the housing 7 is in the form of a hollow cylinder with the diametrical direction thereof at right angles with the lengthwise direction of the rail. The housing 7 has a support shaft 22 extending from its outer periphery, perpendicular to the lengthwise direction of the rail and rotatably mounted on the support member 6. More specifically, a hollow cylindrical case 23 is secured to the rail and has fitted therein a hollow cylindrical damper 24 made of urethane rubber. The support shaft 22 is rotatably inserted through the damper 24 with bearings 25 provided therebetween.

With reference also to FIG. 12, a gear 26 is mounted on the forward end of the support shaft 22. A pneumatic cylinder 28 is mounted on a bracket 27 attached to the case 23. A rack 29 attached to the piston rod of the cylinder 28 is in mesh with the gear 26. The piston rod, when moved, rotates the housing 7 about the shaft 22.

A contact ring 8 is rotatably mounted on the housing 7 with a bearing 30 provided therebetween and has an axis of rotation perpendicular to the support shaft 22. Although the material of the contact ring 8 is urethane rubber according to the present embodiment, the ring may be made of synthetic resin or soft metal such as copper. Further, although the contact ring 8 of the present embodiment is in the form of a single integral member, the ring may comprise two divided members arranged axially of the ring, one positioned toward one end and the other toward the other end.

With reference to FIG. 9, an elongated workpiece 31 to be rotated about its longitudinal axis is inserted through the contact ring 8. When the housing 7 is rotated about the shaft 22, the axis of rotation of the workpiece 31 inclines relative to the axis of rotation of the contact ring 8, and the outer periphery of the elongated workpiece 31 is supported by the axial ends of the inner periphery of the ring 8.

Figure 10:
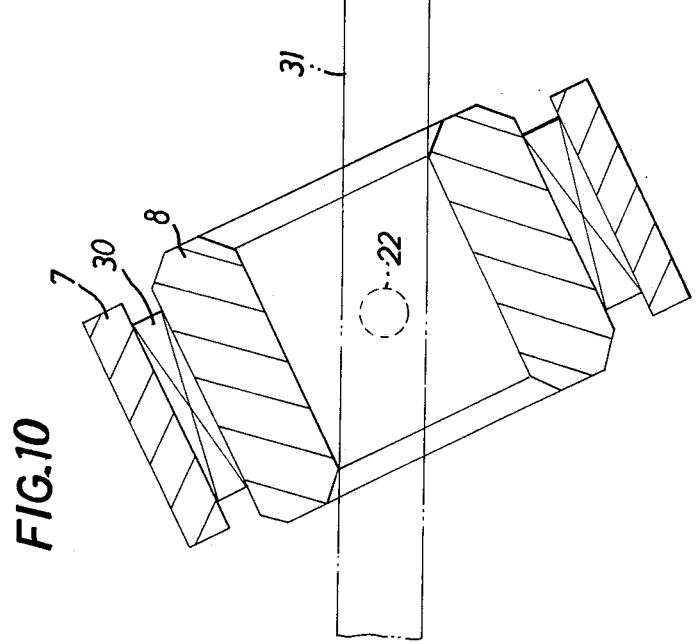

When an elongated workpiece 31 that is different in diameter from the one shown in FIG. 9, is inserted through the contact ring 8 as seen in FIG. 10, the rotation of the housing 7 about the shaft 22 inclines the axis of rotation of the workpiece 31 relative to the axis of rotation of the ring 8 at an angle which differs from the corresponding angle in the case of FIG. 9, whereby the workpiece 31 is supported, again, by the ring 8. With the present embodiment, the angle of inclination is determined by varying the amount of advance or retraction of the piston rod of the pneumatic cylinder 28 according to the diameter of the elongated workpiece 31.

Next with reference to FIG. 1, three rotary members 32 for placing the elongated workpiece 31 thereon are arranged longitudinally of the rail 5. Each rotary member 32 is rotatably mounted on one end of an L-shaped arm 33 by a shaft 34 that is perpendicular to the longitudinal direction of the rail 5. The arm 33 is movably supported on base 4 that is located near the junction of its arm by a pivot 35.

As shown in FIG. 8, the rotary member 32 has a V-groove 36 in its outer periphery. Timing pulleys 37, 38 are mounted respectively on the shaft 34 for the member 32 and the pivot 35 on the arm 33 with a timing belt 39 being reeved around the two pulleys 37, 38. Each pivot 35 carries a bevel gear 40 at one end thereof. Bevel gears 41 meshing with the respective bevel gears 40 are mounted on a single transmission shaft 42. As shown in FIG. 14, the shaft 42 is supported by bearings on the base 4 and carries a bevel gear 43, at one end, which is in mesh with a bevel gear 44 mounted on the output shaft of a motor 45 on the base 4. Thus, the rotary members 32 are drivingly rotated by the motor 45.

Further with reference to FIG. 1, the outer end of the piston rod of a pneumatic cylinder 46 is pivoted as at 47 to the other end of each L-shaped arm 33. The cylinder 46 has its base end pivoted as at 49 to a bracket 48 on the base 4. The piston rod of the cylinder 46, when advanced or retracted, therefore moves the L-shaped arm 33 about the pivot 35. The rotary member 32 is shiftable to a waiting position as shown in FIGS. 1, 2, 5 and 6 or to a supply position as shown in FIG. 3 by the pivotal movement of the arm 33. When rotated into the supply position, the rotary members 32 transport the elongated material 31 thereon longitudinally of the rail to insert the material through the contact rings 8.

As shown in FIG. 20, each pivot 47 connecting the L-shaped arm 33 to the piston rod of the cylinder 46 may be connected to the adjacent pivot 47 by a connecting plate 50 or 52. More specifically, the connecting plate 50 in the front is formed with a slot 52 having the foremost pivot 47 movably engaged therein and is movably supported by the middle pivot 47. The connecting plate 51 in the rear is formed with a slot 53 having the middle pivot 47 movably engaged therein and is movably supported by the rearmost pivot 47. The pivots 47 in the illustrated waiting position are positioned at the front extremities of the respective slots 52 and 53.

When the rotary members 32 are brought to the supply position from the waiting position by pivotally moving the arms 33, the three pneumatic cylinders 46 are initiated into operation in succession, first from the foremost cylinder. Consequently, until the piston rods of all the cylinders 46 start advancing, the connecting plates 50, 51 restrain the arms 33 from movement, with the result that the three arms 33 all pivotally move at the same time. This prevents each arm 33 from moving with a time lag relative to another arm 33, whereby the elongated workpiece 31 on the rotary members 32 is prevented from inclining and slipping downward.

The base 4 is provided with a magazine device 54 for holding thereon a plurality of lengths of elongated workpiece 31 and for feeding them to the rotary members 32 one by one. With reference to FIG. 1, the magazine device 54 has three support frames 55, each of which is attached to the base 4 by a bracket 56. As seen in FIG. 8, the lengths of elongated workpieces 31 are placed side by side on the upper surface of each support frame 55 and are positioned above the center of the peripheral V-groove 36 of the rotary member 32 in the waiting position. The support frame 55 is inclined downward toward the V-groove 36 in a direction perpendicular to the rail. A positioning block 57 disposed above the V-groove 36 is mounted on the frame 55 for preventing the workpiece 31 from rolling down off the support frame 55 and also for positioning the lowermost elongated workpiece 31 above the V-groove 36. Accordingly, when the rotary member 32 rises from the waiting position toward the supply position, the lowermost length of workpiece 31 is placed into the V-groove 36 of the rotary member 32.

A pneumatic cylinder 58 disposed under the support frame 55 has a piston rod carrying a stopper 59. When the rotary member 32 rises from the waiting position to the supply position, the stopper 59 is projected upward beyond the support frame 55 to restrain the lengths of elongated workpieces 31, other than the one in the lowermost position, from rolling down the support frame 55. When the rotary member 32 returns to the waiting position after placing the lowermost workpiece 31 through the contact ring 8, the stopper 59 is moved down below the frame 55 by the retraction of the pneumatic cylinder rod. This permits the elongated workpiece 31 in the second position from the lowermost position to roll along to the lowermost position. The above operation is thereafter repeated in sequence.

The feeder 1 has a feed mechanism 60 for feeding the elongated workpiece 31 longitudinally thereof while the workpiece 31 is in rotation supported by the contact rings 8. As seen in FIG. 1, the feed mechanism 60 has a feed pipe 61 extending along the rail 5 and made movable along the rail 5 by two holders 62, 63 arranged side by side along the rail.

Figure 15:
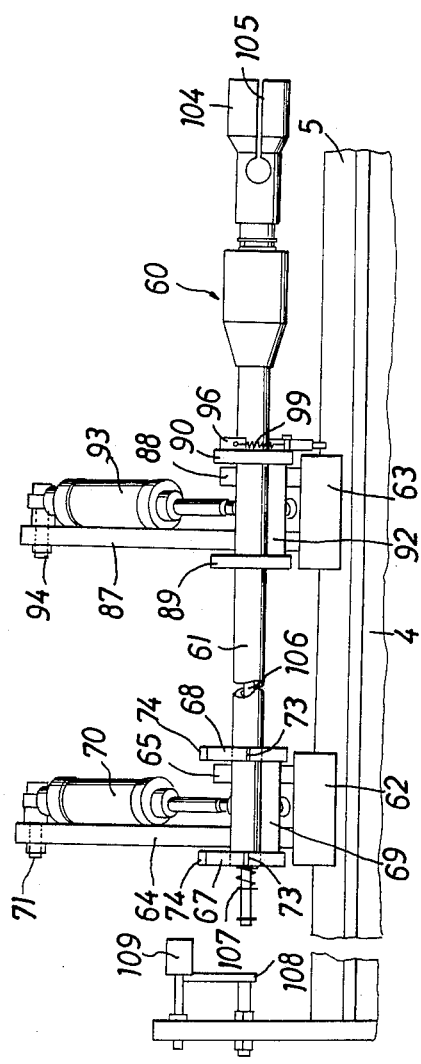
Figure 22:
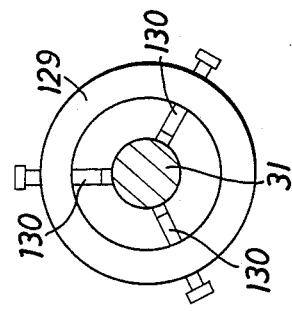
FIG. 22 is a front view in section of the conventional device.
Figure 11:
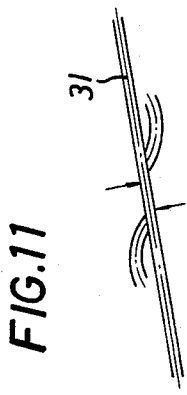
Figure 21:
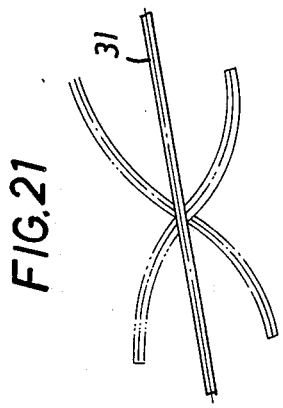
FIG. 21 is a diagram showing how to prevent an elongated workpiece from deflection revolution by a conventional device.

The holder 62 in the rear (at left in FIG. 1), like the support member 6, is supported by the rail 5 with balls (not shown) provided therebetween and is movable along the rail. As shown in FIGS. 15 and 16, opposed front and rear brackets 64, 65 are mounted on the top of the holder 62. The brackets 64, 65 have attached thereto a rod 66 that extends along the rail, and a pair of front and rear arms 67, 68 that are rotatable about the rod 66 and serve for holding the feed pipe 61. The two arms 67, 68 are interconnected by a connector 69, to which the piston rod of a pneumatic cylinder 70 is pivoted by a ball joint. The pneumatic cylinder 70 has its base end attached to the bracket 64 by a pivot 71. The rod of the cylinder 70, when advanced or retracted, rotates the arms 67, 68 about the rod 66 to move the feed pipe 61 upward or downward. A hole 72 is formed in each of the arms 67, 68 and has the rear end of the feed pipe 61 inserted therein. A slit 73 communicating with the hole 72 is formed in each arm. The feed pipe 61 inserted in the hole 72 is fastened and held by the arm by reducing the width of the slit 73 with a bolt 74.

The rear holder 62 is moved by a holder drive mechanism 75. Connected to the rear holder 62 is a chain 76 which is reeved around front and rear sprockets 77, 78 that are attached to the front and rear ends of the base 4, respectively. The rear sprocket 78 is freely rotatable, while the front sprocket 77 is driven by the motor 17 as shown in FIG. 13. More specifically, a gear 79 is mounted on the output shaft 18 of the motor 17 and is in mesh with a movable gear 80, which, in turn is in mesh with a gear 81 on a shaft 82 for the sprocket 77. Thus, the rear holder 62 is driven longitudinally of the rail by the rotation of the motor 17.

The movable gear 80 is movable about the output shaft 18 by the same arrangement as the support member drive mechanism 10 and is selectively brought into or out of mesh with the gear 81 by a pneumatic cylinder 83, whereby power transmission to the sprocket 77 is effected or interrupted.

Tension sprockets 84, 85 and 86 are in mesh with the chain 76. The sprocket 84, which is positioned in the front, is shiftable to adjust the tension on the chain 76.

With reference to FIGS. 15 to 17, the front holder 63, like the rear holder 62, is supported on the rail 5 with balls (not shown) provided therebetween and is movable longitudinally of the rail. Opposed front and rear brackets 87 and 88 mounted on the top of the holder 63 is provided with arms 89, 90, respectively, that are rotatable about a rod 91. A pneumatic cylinder 93 has a piston rod pivoted by a ball joint to a connector 92 between the arms 89, 90. The cylinder 93 has its base end pivoted to the bracket 87 as at 94.

A hole 95 formed in each of the arms 89, 90 has the feed pipe 61 slidably inserted therethrough. An L-shaped restraining member 96 is provided for restraining the feed pipe 91 relative to the arms 89, 90 to make the pipe 61 movable with the front holder 63.

The restraining member 96 is movably supported by a pivot 97 on the arm 90 and is formed at its forward end with a pressure face 98 that is positionable along the outer periphery of the feed pipe 61. The pressing face 98 is pressed against the outer periphery of the feed pipe 61 by a tension spring 99 extending between the restraining member 96 and the arm 90. The portion of the feed pipe 61 to be in pressing contact with the face 98 is circumferentially grooved as at 100 and has a smaller outside diameter than the other portion, such that the front and rear surfaces of the restraining member 96 come into contact with the grooved portion 100 and the arm 90, restraining the feed pipe 61 from sliding relative to the arm 90. Means is also provided for releasing the pipe 61 from restraint.

Figure 7:
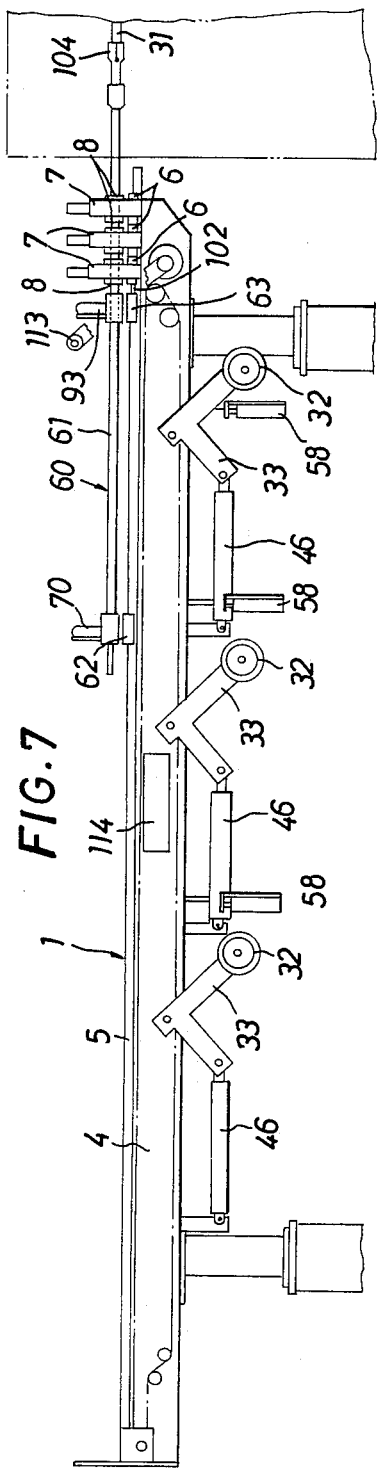

With reference to FIG. 17, the restraining member 96 has a pin 101 projecting downward from its base end. A block 102 engageable with this pin 101 is mounted on the top of the base 4. As seen in FIG. 7, the block 102 is positioned immediately in front of the foremost position to which the front holder 63 is movable forward. As shown in FIG. 18, the block 102 is formed in its top side with a guide groove 103 that is positioned closer to the pipe 61 as it extends forward. With the advance of the feed pipe 61, therefore, the lower end of the pin 101 enters the guide groove 103 and moves along the groove 103, whereby the restraining member 96 is moved about the pivot 98 as indicated in phantom line in FIG. 17, rendering the feed pipe 61 slidable longitudinally thereof relative to the arm 90. Further when the grooved portion 100 is brought to the position it is to be pressed on by the pressing face 98 of the restraining member 96 with the rearward movement of the feed pipe 61, the front holder 63 is pushed rearward by the feed pipe 61, and the pin 101 retracts along the guide groove 103. Consequently, the restraining member 96 comes into contact with both the arm 90 and the grooved portion 100, causing the holder 90 and the feed pipe 61 to move together.

With reference to FIG. 15, the feed pipe 61 is provided at its forward end with a chuck 104 that is rotatable about a longitudinal axis. The chuck 104 has a split 105 in its forward end and elastically enlarges to hold the rear end of the elongated material 31.

The feed pipe 61 has a rod 106 inserted therethrough and movable longitudinally thereof. The rod 16 has a rear end projecting rearward from the feed pipe 61 and having a compression spring 107 therearound. The base 4 has attached thereto a contact plate 108 for the rear end of the rod 106 to come into contact with. When the feed pipe 61 retracts, the rod 106 contacts the plate 108, whereupon the rod 106 advances relative to the pipe 61 against the force of the spring 107, forcing out the workpiece 31 from the holder 104. Indicated at 109 is a magnet for positioning the holder 62 in its retracted position as specified.

With reference to FIG. 1, an arm 110 having a pneumatic rotary actuator 111 is attached to the front end of the base 4 for rotation about a shaft 112. The arm 110 carries a roller-type rotation sensor 113 which is moved into or out of contact with the elongated workpiece 31 when the arm 110 is rotated about the shaft 112. The distance of longitudinal movement of the elongated workpiece 31 is detectable by the sensor 113 when the sensor is rotated by the movement of the material 31.

As shown in FIG. 19, the base 4 is provided with a scrap discharge mechanism 114 which is disposed below the scrap 31a to be pushed out from the chuck 104 by the rod 106 as seen in FIG. 1. A pneumatic cylinder 115 is mounted on the base 5 with its piston rod extending perpendicular to the rail 5. A guide bracket 117 extends from the base end of the cylinder 115 to an opening 116 formed in the base 4. A movable bracket 118, disposed on the upper surface of the guide bracket 117, is slidable perpendicular to the lengthwise direction of the rail. A pin 119, projecting downward from the movable bracket 118, is loosely inserted through a block 120 that is attached to the forward end of the piston rod of the cylinder 115. The block 120 is connected to the movable bracket 118 by a sensor 121.

The piston rod of the cylinder 115, when advanced, advances the movable bracket 118 to the brokenline position shown in FIG. 19, below the scrap 31a held by the holder 104. Upon the scrap 31a falling onto the movable bracket 118 by being pushed out by the rod 106, the forward end of the movable bracket 118 is pivotally moved downward by the weight of the scrap. This movement actuates the sensor 121, which in turn produces a signal to retract the piston rod of the cylinder 115. The retraction of the piston rod returns the movable bracket 118 to its original position, discharging the scrap 31a into an unillustrated scrap tank through the opening 116. The piston rod of the cylinder 115 is advanced again in response to a signal from the sensor 121.

The operation of the apparatus of the above construction will be described below.

With reference to FIG. 1, the apparatus is set in the initial state wherein the support members 6 are in the foremost position relative to the rail 5, the rotary members 32 are in the waiting position, the feed mechanism 60 in the rearmost position relative to the rail 5, the feed pipe 61 in its upward retracted position and the rotation sensor 113 in its raised position.

Figure 2:
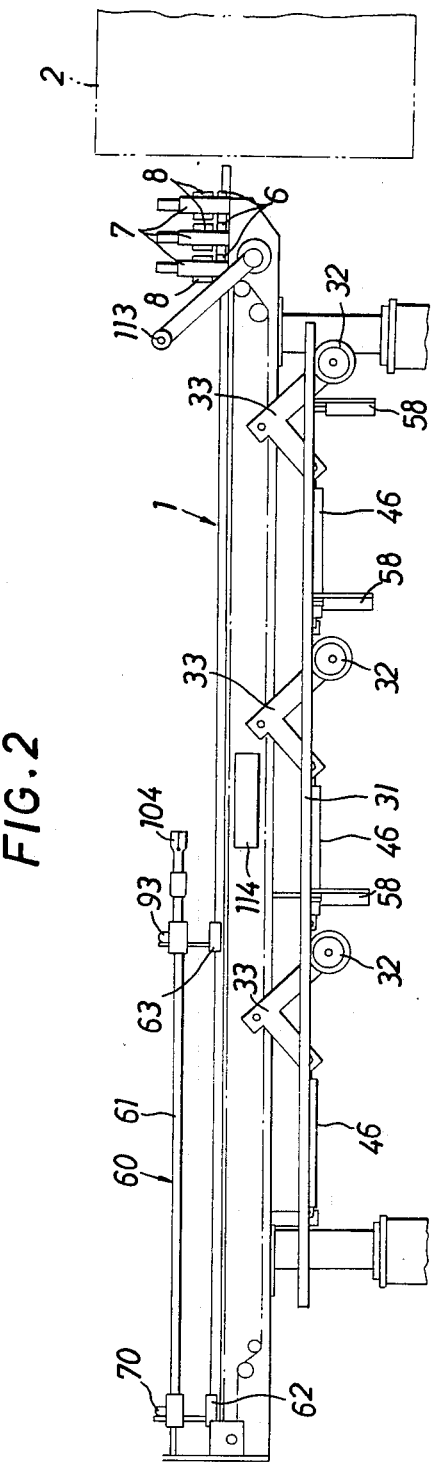

With reference to FIG. 2, an elongated workpiece 31 is fed to the magazine device 54, and the piston rods of the pneumatic cylinders 46 are advanced to bring the rotary members 32 to the supply position as seen in FIG. 3.

Next, the rotary members 32 are rotated to transport the elongated workpiece 31 forward through the contact rings 8 as shown in FIG. 4. The rotary members 32 are driven until the rear end of the workpiece 31 is positioned in front of the feed pipe 61. Subsequently, the rearmost rotary member 32 is brought to the waiting position by the pneumatic cylinder 46 associated therewith, and the pneumatic cylinders 70 and 93 are thereafter operated to bring the feed pipe 61 to the lowered position.

The other cylinders 46 are then operated to bring the foremost and intermediate rotary members 32 to the waiting position as seen in FIG. 5. The drive mechanism 10 is thereafter operated to move the support members 6 rearward and arrange the members 6 at the specified distance from one another as already stated.

With reference to FIG. 6, the housings 7 are next rotated about the respective support shafts 22 by the pneumatic cylinders 28, whereby the outer periphery of the elongated workpiece 31 is supported by the inner periphery of each contact ring 8 at its axial one ends, with the center axis of the workpiece 31 positioned at the definite level. The drive mechanism 75 is thereafter operated, moving the rear holder 62 to advance the feed pipe 61 and causing the chuck 104 to hold the elongated workpiece 31 to transport the workpiece forward. At this time, the front holder 63 is also advanced with the pipe 61 by means of the restraining member 96. Thus, the feed pipe 61 is supported at two positions with good stability.

The workpiece 31 is inserted through a chuck 122 of the working machine by being sent forward and brought to a predetermined position relative to a cutting tool 123 of the machine 2. At this position, the workpiece 31 is held by the chuck 122, whereupon the rotary actuator 111 functions to lower the rotary sensor 113 and detect the amount of feed of the workpiece 31 relative to the working machine 2.

With the workpiece 31 held by the chuck 122, the machine rotates the workpiece 31 about its longitudinal axis and feeds the it at a speed suitable for cutting, causing the cutting tool 123 to machine the workpiece as desired. During machining, the elongated workpiece is fed longitudinally thereof, not by the feed mechanism 60, but by the working machine 2. However, to cause the feed tube 61 to exert a slight pushing force on the workpiece 31, the feed pipe 61 is also advanced in the longitudinal direction during the machining operation to, thereby prevent the workpiece 31 from slipping off the chuck 104.

The feed pipe 61 advances as the workpiece 31 is machined. When it becomes no longer necessary to prevent the workpiece 31 from deflecting as it rotates, because it has been shortened, the housings rotate about the respective shafts 22 and return to the initial position as shown in FIG. 7. When the front holder 63 is brought to the foremost position, the restraining member 96 pivotally moves as already stated, permitting the feed pipe 61 to advance relative to the front holder 63 and pass through the contact rings 8.

When the elongated workpiece 31 has been completely machined, the feed pipe 61 retracts and returns to the initial position as shown in FIG. 1, whereby the remaining piece, i.e. scrap, 31a, is pushed out from the chuck 104 by the rod 106 as already described. The scrap 31a is discharged into the scrap tank by the discharge mechanism 114. The above operation is repeated to machine all the lengths of workpiece 31 on the magazine 54, whereupon the apparatus is brought out of operation.

The feeder 1 may be operated in sequence by manual control, or for example, by an unattended sequence control system. In the latter case, the working machine 2 is controlled, for example, by NC system, and the feeder is provided with sensors for detecting the movement of the support members 6, housings 7, rotary members 32, feed mechanism 60 and magazine device 54 for feeding signals to the sequence control system.

Although the elongated workpiece 31 is in the form of a solid round bar, hollow or workpieces with a square to rectangular cross section can be handled similarly.

What is claimed is:

1. An apparatus for feeding a rotating elongated workpiece characterized in that the apparatus comprises a rail, a plurality of support members mounted on said rail and movable longitudinally of the rail, said support members having a support shaft extending perpendicular to the length of the rail, a housing mounted on each of the support members and being rotatable about the support shaft thereof, a contact ring mounted on the housing and rotatable about an axis perpendicular to the support shaft, said contact ring having an opening for receiving the elongated workpiece therethrough, and being rotatable about its longitudinal axis as positioned longitudinally of the rail, the axis of rotation of each contact ring being variable relative to the rotational axis of the elongated material by pivoting of the housing about the support shaft, the outer periphery of the elongated workpiece being supported by the inner periphery of each contact ring at its axial ends, and a feed mechanism for longitudinally feeding the elongated workpiece while being rotated by the contact rings.

2. An apparatus as defined in claim 1, wherein a plurality of rotary members are arranged longitudinally of the rail, each rotary member being rotatable about a shaft that extends perpendicular to the length of the rail for supporting the elongated material thereon, shifting means for shifting each of the rotary members between an upward supply position and a downward waiting position, the rotary members acting, in said supply position, as a means for transporting the elongated workpiece longitudinally thereof and through the contact rings by rotation of the rotary members.

3. An apparatus as defined in claim 2, which further comprises a magazine device having a support frame at a diametrical side of the rotary member, the support frame having an inclined upper surface slanting downward toward the rotary member in a direction perpendicular to the rail for receiving a plurality of lengths of elongated workpieces arranged side-by-side along the rail with the lowermost length of elongated workpiece positioned above the rotary member when the rotary member is in the waiting position.

4. An apparatus for feeding a rotating elongated workpiece as defined in claim 2, wherein the apparatus further comprises a plurality of cylinders and pivotally movable arms, each of the rotary members being mounted on an arm and each arm being connected to a respective cylinder for being moved upward and downward by the cylinder, a magazine device having a support frame at one diametrical side of the rotary member, the support frame having an inclined upper surface slanting downward toward the rotary member in a direction perpendicular to the rail for receiving a plurality of lengths of elongated workpieces arranged side-by-side along the rail with the lowermost length of elongated material positioned above the rotary member when the rotary member is in the waiting position, the feed mechanism comprising a pair of holders mounted for movement longitudinally of the rail, a feed pipe mounted on the holders, a chuck attached to the forward end of the feed pipe for holding the elongated workpiece, and a rod inserted through the feed pipe for pushing out a scarp piece of the material from the chuck, means for shifting the feed pipe upward and downward between a retracted position above the elongated workpiece and a position for holding the elongated workpiece with the chuck, the holders being arranged side-by-side along the length of the rail, one of the holders being positioned closer to the contact ring and being selectively changeable between a state in which the holder is slidable relative to the rail longitudinally thereof and a state in which the holder is restrained from sliding longitudinally of the rail, a chain by which the support members are interconnected so as to be spaced apart from one another at a specified distance and are drivingly movable longitudinally of the rail, a drive mechanism for moving the support members, a drive mechanism for rotating the housing, a drive mechanism for rotating the rotary members, a drive mechanism for moving each rotary member upward and downward, a drive mechanism for moving the other holder, and a drive mechanism for moving the feed pipe upward and downward.

5. An apparatus as defined in any one of claims 1 through 3, wherein the feed mechanism comprises a holder that is movable longitudinally of the rail, a feed pipe mounted on the holder, a chuck attached to a forward end of the feed pipe for holding the elongated material, and a rod inserted through the feed pipe for pushing out a scrap piece of the material from the chuck.

6. An apparatus as defined in claim 5, wherein the feed pipe is movable upward and downward between a retracted position above the elongated workpiece and a position for holding the elongated workpiece with the chuck.

7. An apparatus as defined in claim 5, wherein a pair of holders are arranged side by side along the length of the rail, one of the holders being positioned closer to the contact ring and being selectively changeable between a state in which the holder is slidable relative to the rail longitudinally thereof and a state in which the holder is restrained from sliding longitudinally of the rail.

8. An apparatus as defined in claim 5, which further comprises a scrap discharge mechanism disposed below the chuck for receiving a scrap piece pushed out from the chuck by the rod.

9. An apparatus as defined in any one of claims 1 to 3, wherein the support members are interconnected by a chain so as to be spaced apart from one another at a specified distance, the chain forming a means for drivingly moving the support members longitudinally of the rail.

10. An apparatus as defined in any one of claims 1 to 3, which further comprises a sensor for detecting the distance of movement of the elongated workpiece in the longitudinal direction.

11. An apparatus as defined in any one of claims 1 to 3, wherein the contact ring is in the form of a single integral member.

12. An apparatus as defined in any one of claims 1 to 3, wherein the contact ring comprises two divided members arranged axially of the ring, one of the divided members being positioned toward one end of the ring, the other member being positioned toward the other end thereof.

13. An apparatus as defined in claim 2 or 3, wherein the rotary members are individually mounted on arms, each arm being pivotally movable upward and downward by a cylinder, the arms being connected to one another by a connecting plate along the rail, the connecting plate being connected at one end to one of an adjacent two of the arms through a slit and at a second end thereof to a second arm by a pivot.

* * * * *